D. J. NEVILL.
ORE CLASSIFIER.
APPLICATION FILED JAN. 28, 1913.
1,156,543.
Patented Oct. 12, 1915.
4 SHEETS—SHEET 2.
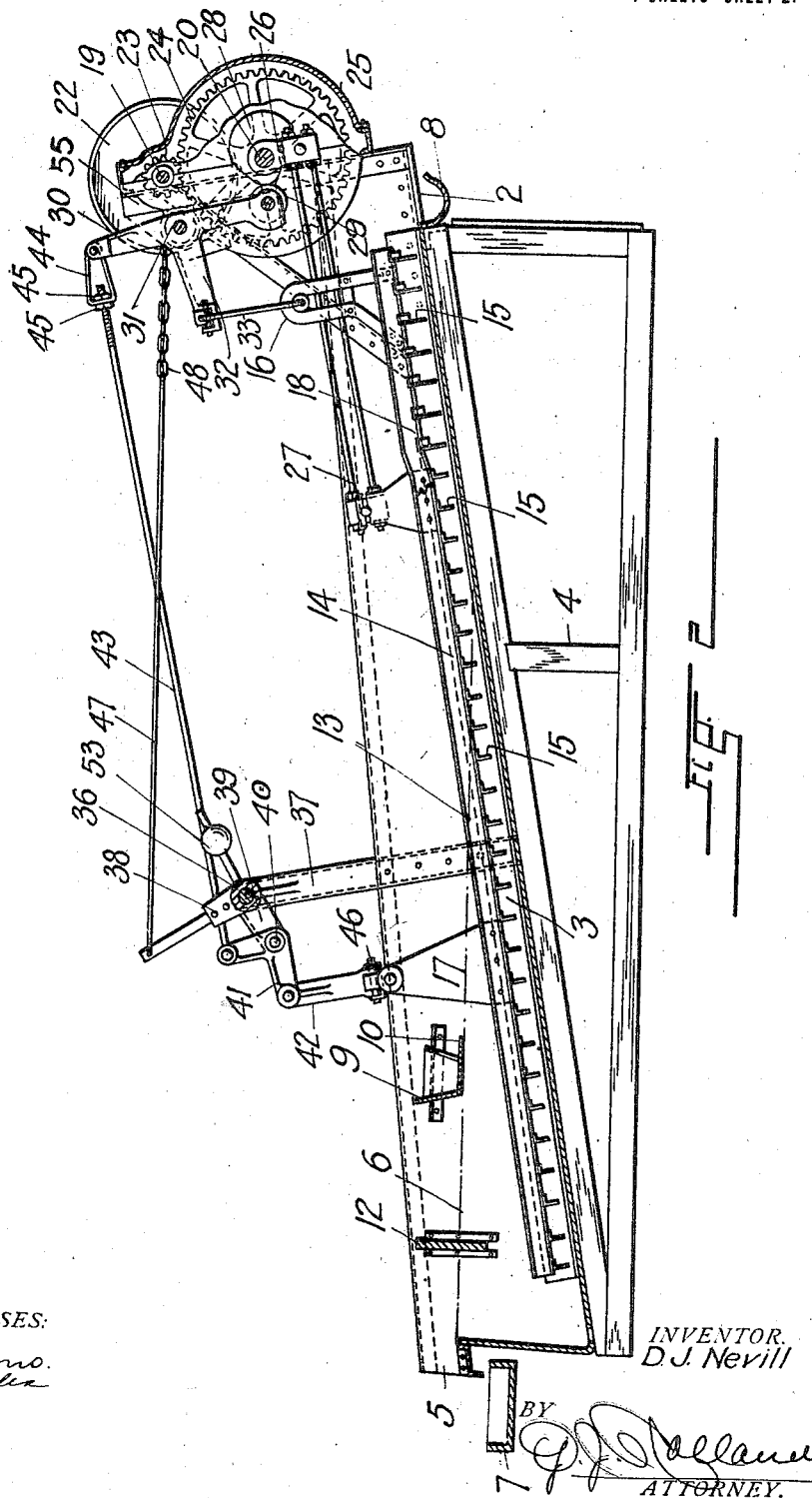
WITNESSES:
INVENTOR.
D. J. Nevill
BY
ATTORNEY.

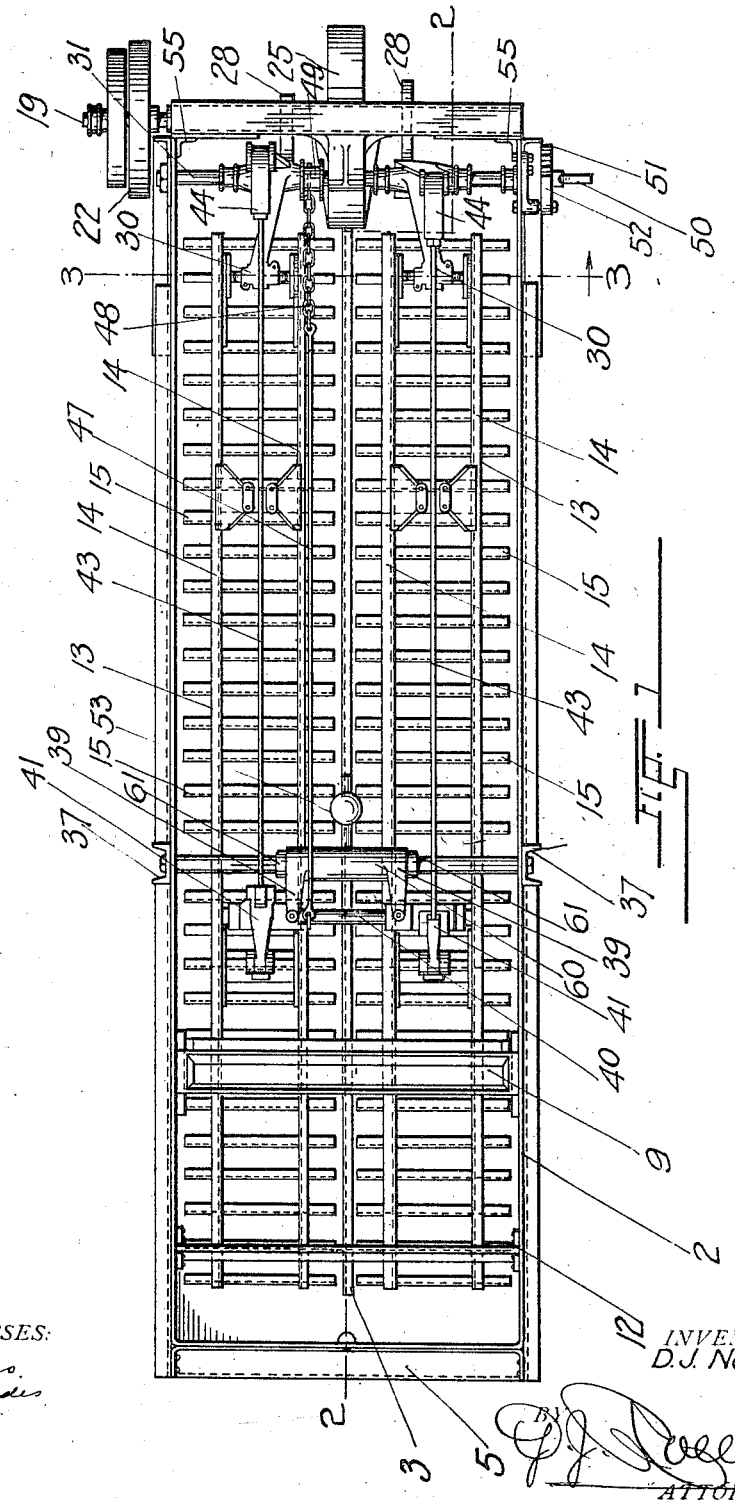

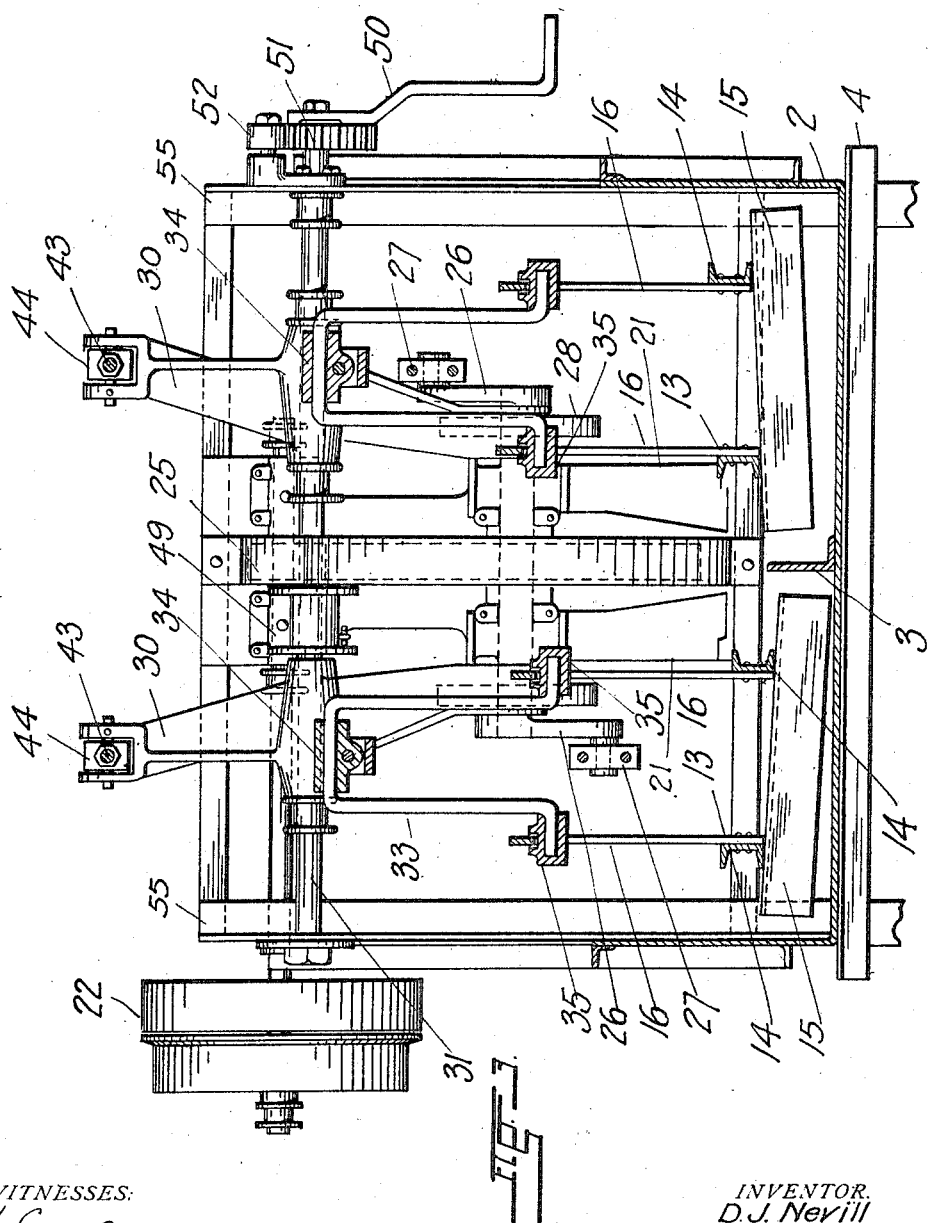

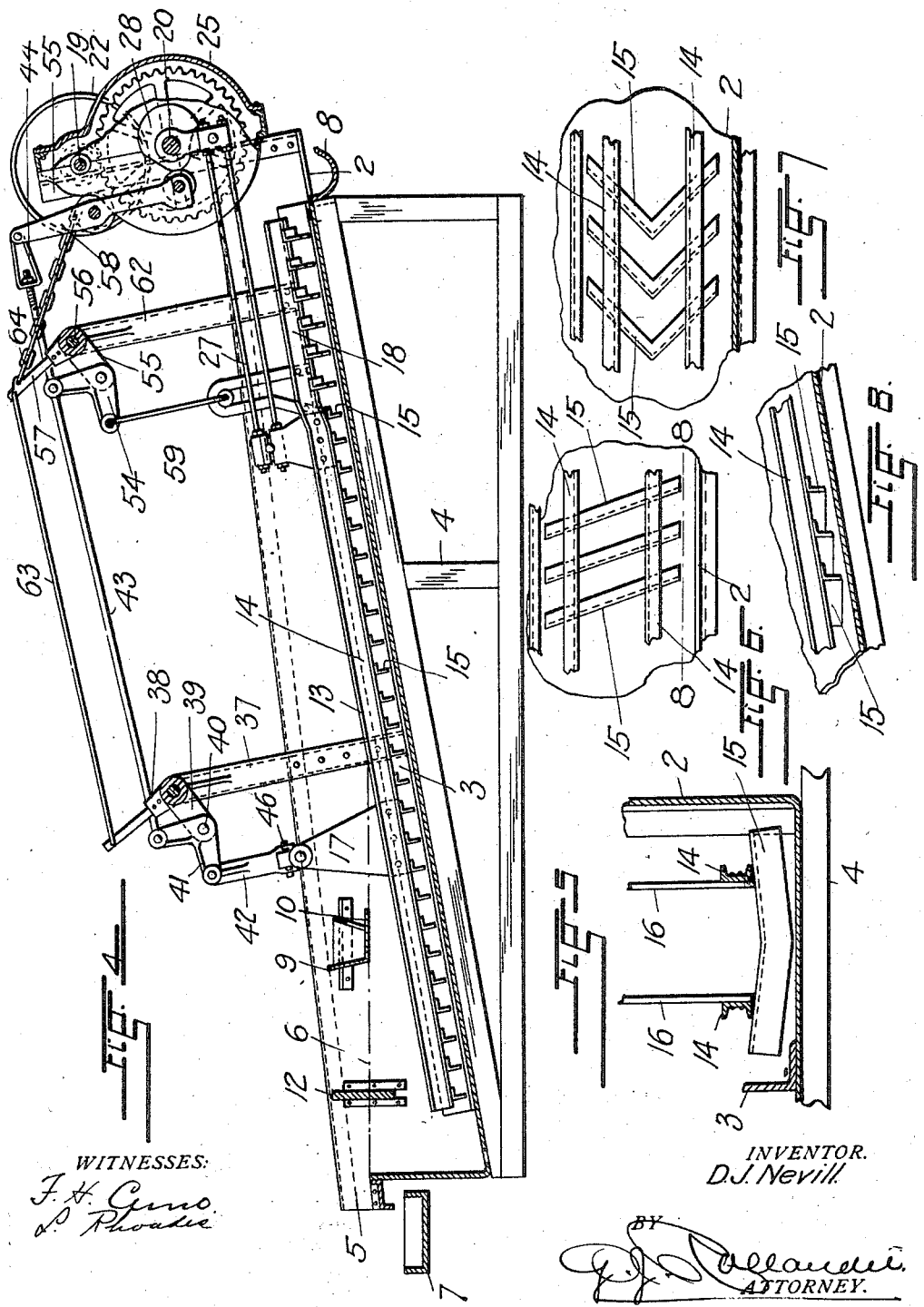

UNITED STATES PATENT OFFICE.

DAVID J. NEVILL, OF DENVER, COLORADO, ASSIGNOR TO THE DORR CYANIDE MACHINERY COMPANY, OF DENVER, COLORADO, A CORPORATION.

ORE-CLASSIFIER.

1,156,543.   Specification of Letters Patent.   Patented Oct. 12, 1915.

Application filed January 28, 1913. Serial No. 744,644.

*To all whom it may concern:*

Be it known that I, DAVID J. NEVILL, a subject of George V, King of Great Britain, etc., having declared my intention of becoming a citizen of the United States, residing at Denver, in the county of Denver and State of Colorado, have invented certain new and useful Improvements in Ore-Classifiers, of which the following is a specification.

My invention relates to a classifier or dewaterer of the type shown and described in United States Letters-Patent No. 849,379, John Van N. Dorr, April 9, 1907; No. 996,624, John Van N. Dorr, July 4, 1911, and No. 1,024,647, David J. Nevill, April 30, 1912, which, briefly, consists of an inclined settling trough in which a rake element has a reciprocating movement to impel the sands settled out of a wet pulp, to a discharge opening at the upper end thereof while the slimes are maintained in suspension and discharged at the opposite end of the same.

The rake element is at the ends of its strokes, alternately raised and lowered so that during its return or downward motion, it will move above the surface of the sands in the trough, and an adjustment is provided whereby when the machine is stopped for any length of time, the rake may be moved to a plane above the surface of the material contained in the trough to prevent the settling and packing matter from obstructing its movement when the operation of the machine is subsequently resumed.

The present invention relates more particularly to improvements in the rake element above referred to and in the mechanism for operating and adjusting the same, and one of its objects is to provide a rake construction by which the transverse gullies produced in the sands on the bottom of the trough by the reciprocating motion of the rake-blades, are at the upper end of the said trough, formed to slope toward one side of the same for the purpose of draining water carried upwardly with the sand, to the lower end of the machine.

Another object of my invention consists in providing certain improvements in the operating and adjusting mechanisms above referred to, whereby their construction is simplified and their operation greatly facilitated.

The above and other objects all of which will be fully brought out in the following description, I attain by the mechanism illustrated in the accompanying drawings in the various views of which like parts are similarly designated, and in which—

Figure 1, represents a plan view of my improved classifying apparatus; Fig. 2, a longitudinal, vertical section through the same taken along the line 2—2, Fig. 1; Fig. 3, a transverse section along the line 3—3, Fig. 1, drawn to an enlarged scale; Fig. 4, a sectional view similar to that shown in Fig. 2, illustrating a modified construction of the mechanisms employed for the operation and adjustment of the rake elements; Fig. 5, a transverse section through one of the trough-compartments, showing a modification of the construction of the rake blades at the upper end of the machine; Figs. 6 and 7 fragmentary plan-views of the upper portion of the rake illustrating still other modifications in the construction of the same, and Fig. 8, a section taken along the line 8—8, Fig. 6.

Referring more specifically to the drawings, the reference numeral 2 designates an inclined settling box or trough which by means of a central, longitudinally extending partition 3, is divided into two adjoining compartments.

The trough which is fixedly supported upon a basal structure 4 of suitable construction, is closed at its lower end to a point near the upper edges of its sides, at which it is provided with an overflow 5 which determines the water level in the trough as indicated by a broken line 6 in Fig. 2, and through which the slimes contained in the pulp are discharged from the machine into a launder 7 which conveys them to a suitable receptacle remote from the classifier.

The sands which by the action of the rakes hereinafter to be described, are moved to the upper, open end of the trough, are discharged through the said end into another launder 8.

The aqueous pulp to be operated upon is fed into the trough at a point nearest the lower end thereof through a transversely disposed feed hopper 9 which at its lower end has a plurality of outlet slots through which the material flows onto a distributing plate 10, and a baffle board 12 which is vertically adjustably disposed in guide grooves on the sides of the trough at a point between the feed hopper and the lower end of the machine, is provided to regulate the velocity with which the fluid matter flows through the overflow 5 and to determine, in consequence, the carrying power of said fluid for the fine material of which said slimes are composed.

In the operation of the machine, the sands contained in the material under treatment which settle on the bottom of the trough, are moved to the upper end of the same by the action of reciprocating rakes 13 which being separately and coöperatively disposed in the two compartments of the trough, are each composed of a pair of longitudinal bars 14 connected by a plurality of equidistant, downwardly extending rake-blades 15. Each rake is provided at its end adjacent the upper end of the trough, with a pair of upwardly extending link-shaped hangers 16 and at a point remote from the said end, with a single hanger 17 composed of two plates which extending convergently from the bars, are connected at their upper ends, the said several hangers being provided for the connection of the rakes with the operating and adjusting mechanisms hereinafter to be described. The outer one of the two longitudinal bars comprised in each rake is at its end adjacent the upper end of the trough, offset in an upward direction as shown at 18 in Fig. 2, for the purpose of inclining the blades disposed at the said end, from their outer ends inwardly as is best shown in Fig. 3 of the drawings. When in the operation of the machine, the rakes are reciprocated, the blades moving laterally through the sand on the bottom of the trough, form transverse ridges and by inclining the blades at the upper end of the trough, as above described, the gullies between the said ridges will at the said end be formed to slope toward the center of the trough and thus facilitate the drainage of fluid carried upward with the sand, toward the lower end of the machine.

It will be readily understood that the above result may be obtained by divers other methods as for example, by inclining the lower edges of the blades upwardly in opposite directions from a central point as shown in Fig. 5, by placing the blades obliquely with relation to the direction in which the rakes have their reciprocating movement, whereby their horizontally disposed lower edges are disposed at an angle to the bottom surface of the trough as illustrated in Figs. 6 and 8, or by providing angular blades whose sides converge from a central longitudinal line in the rake element, for the same purpose, as is shown in Fig. 7.

The rakes disposed in the two compartments of the trough are similar in construction and coöperatively connected with one and the same adjusting and operating mechanism, but their connection with the latter is such that as the rake in the one compartment moves upward, that in the other is impelled in the opposite direction.

The improved operating and adjusting mechanisms of the present invention consist in their preferred form as illustrated in Figs. 1 and 2 of the drawings, of a pair of parallel shafts 19 and 20 which are rotatably mounted in boxes on a pair of connected standards 21 erected at the upper end of the trough 2.

The upper one of the two shafts carries a pulley 22 for its operative connection with a conveniently located motor and its rotary movement is transmitted to the lower shaft by means of a pair of gear wheels 23 and 24 which are preferably inclosed in a casing 25.

The shaft 20 is provided at its ends with oppositely extending cranks 26 which by means of pitmen 27 are connected with the rakes in the trough compartments to impart a reciprocating movement to the same, and the said shaft is furthermore provided with cams 28, the circumferential faces of which are engaged by anti-friction wheels 29 at the lower ends of levers 30 which are fulcrumed upon a shaft 31 that is rotatably supported in bearings on a frame 55 at the upper end of the trough.

The levers 30 are at their upper ends, connected with the hangers 17 of the respective rakes, through the medium of a system of levers hereinafter to be described and they are each provided with laterally extending arms 32 which at their outer extremities are connected with the link-shaped hangers 16 by means of inverted U-shaped yokes 33 whose upper or transverse portions are rotatably mounted in boxes 34 which are pivotally supported to move about transverse axes, in seats formed at the ends of the respective lever arms.

The yokes are at the extremities of their downwardly extending members, bent outwardly for the provision of trunnions which are rotatably fitted in boxes 35, and these boxes project loosely through the up and downwardly extending slots of the hangers 16.

Rotatably mounted upon a transverse shaft 36 which is supported on uprights 37 secured to the sides of the trough, is a bell-crank composed of a single upwardly extending arm 38 and two laterally projecting arms 39 formed integral with a sleeve 60 which at its ends is engaged by collars 61 on the shaft, to prevent its longitudinal displacement.

The arms 39 of the bell-crank carry at their extremities, a shaft 40 upon which are fulcrumed two bell-cranks 41, the arms of which are respectively connected with the upper ends of the levers 30 and with the hangers 17 near the lower ends of the rakes.

The connections between the bell-cranks 41 and the respective levers 30 are established by means of rods 43 which at one of their ends are pivotally attached at the extremities of the bell-crank arms and which at their opposite ends are threaded and provided with nuts 45 for the adjustment of links 44 which loosely embrace transverse pins applied at the ends of the levers 30.

The connections between the lower-arms of the two bell-cranks 41 and the hangers 17 on the respective rakes consist of links 42 which at their upper extremities are pivotally attached to the said crank-arms and which at their opposite ends are connected with the hangers through the intermediary of universal joints 46 which are provided to permit of a limited independent movement of the rakes to prevent their breakage by engagement with obstructions encountered during their reciprocating movement.

The single, upwardly extending arm 38 of the bell-crank on the shaft 36 is by means of a rod 47, connected with a chain 48, whose opposite end is attached to a winding drum 49 which is rigidly mounted upon the transverse shaft 31 upon which the levers 30 are fulcrumed.

The shaft 31 is at one of its ends, provided with a crank-handle 50 by means of which it can be rotated for the purpose of winding the chain 48 upon the drum, and it furthermore carries a ratchet wheel 51 which in conjunction with a pawl 52 mounted on an adjacent part of the frame 55, prevents its retrograde movement.

In the operation of the classifier the rotary movement of the crank-shaft 20 is by means of the pitmen 27 converted into a longitudinally reciprocating movement of the two rakes in opposite directions. During the upward, effective stroke of the rakes in which the lower edges of their blades move in a plane substantially parallel to the bottom surface of the trough, the sands settled out of the pulp are moved upwardly along the said surface to be discharged through the open upper end of the trough, while the slimes are maintained in suspension and discharged through the overflow at the lower end of the same. The rakes are at the termination of their effective stroke lifted above the surface of the sand in the trough by the action of the cams 28 on the lower arms of the levers 30, and are by gravitation, lowered to their normal position in close proximity to the bottom surface of the trough at the end of their return stroke before they are again moved upwardly to impel the sand toward the discharge opening at the upper end of the same.

When the operation of the machine is discontinued for any length of time, the pulp remaining in the trough and more particularly that contained in the lower portion of the same, settles and packs and would, if the rakes remained in their normal position, embed their blades in a mass of sufficient solidity to prevent their movement when the operation of the machine is subsequently resumed. To prevent an occurrence of this character, the rakes are moved out of the pulp contained in the trough before it has had an opportunity to settle, by winding the chain 48 upon the drum through rotation of the shaft 31, which causes the bell-crank mounted upon the shaft 36 to move about its axis of rotation, thereby raising the fulcrum of the bell-crank 41 and compelling the rakes to swing about their points of suspension from the lever arms 32.

The adjustment of the rakes while being more especially provided for the above mentioned purpose, is also of use when it is desired to reduce the settling area of the material for the purpose of varying the degree of coarseness at which the sands and slimes are delivered at the opposite ends of the trough. While heretofore it was necessary for the accomplishment of this purpose to vary the inclination of the entire trough, the same result may now be attained by changing the angle of the plane in which the rake blades have their movement, relative to the bottom surface of the trough.

The loose connection of the rods 43 with the upper arms of the lever 30, the pivotal connection of the boxes 34 with the lateral arms of the same, the connection of the yokes 33 with the hangers 16 whereby they may move downwardly through the slots thereof, and the universal connections between the hangers at the lower portions of the rakes and the links 42 by which they are connected with the bell-cranks 41, coöperate for the self-adjustment of the rakes either laterally or up and downwardly to prevent breakage by the engagement of their blades with rocks and other obstructive objects in the trough, and to relieve the operating parts from strain and consequent wear.

The operation may, if so desired, be facilitated by the application of a counterweight 53 on the bell-crank mounted on the shaft 36, as is shown in Fig. 2, and it will be understood that other variations in the construction and arrangement of the parts may be resorted to within the scope of the claims and that in small capacity machines, a single rake may be operated in an undivided trough by similar mechanism and in the same manner as that hereinabove described.

While the adjustment of the rakes to a plane at an angle to that in which it has its reciprocating movement is preferable for the reasons mentioned, they may if so desired be lifted to a plane substantially parallel to the bottom of the trough by modifying the construction of the adjusting mechanism as is shown in Fig. 4 of the drawings. In this modified construction the rakes are at their upper ends, suspended from bell-cranks 54 which like those from which their lower ends are suspended, are fulcrumed upon the lower arms 55 of a bell crank which is movably mounted on a shaft 56 supported on uprights 62 which are secured to the sides of the trough.

The upper arm 57 of the bell crank on the shaft 56 is by means of a rod 63 connected with the corresponding arm 38 of the bell-crank on the shaft 36, and by means of a chain 64 with the drum 49, and the upper arms of the bell-cranks 54 are pivotally connected with the rods 43 by means of which the movement of the levers 30 is transmitted to the respective bell-cranks 41 in the construction shown in Fig. 1.

The connection between the hangers 16 and the bell-cranks 54 may be established by yokes 59 similar to those used for connecting said hangers with the lever arms 32 in the preferred construction, and levers 58 formed without the lateral arm 32, are used to convert the rotary motion of the cams 28 into a rocking movement of the bell-cranks 41 and 54 from which the rakes are suspended.

Having thus described my invention what I claim and desire to secure by Letters-Patent is:

1. In apparatus of the character described, a reciprocating rake having a pair of slotted hangers, and means for movably suspending said rake, including a pivotally mounted yoke extending loosely in the slots of said hangers.

2. In apparatus of the character described, a three-armed lever, a bell-crank operatively connected with one of said arms, a rake movably suspended from said bell-crank and an other arm of said lever, mechanism for imparting a reciprocating movement to said rake, and a cam coöperative with said mechanism for engagement with the third arm of said lever to move the latter about its fulcrum at determinate points in said movement.

3. In apparatus of the character described, a three-armed lever, a bell-crank, a rake movably suspended from arms of said bell-crank and said lever, a rod connecting the other arm of the bell crank with another arm of said lever, mechanism for imparting a reciprocating movement to said rake, and a cam coöperative with said mechanism for engagement with the third arm of said lever to move the latter about its fulcrum at determinate points in said movement.

4. In apparatus of the character described, a three-armed lever, a bell-crank, a rake movably suspended from arms of said bell crank and said lever, a rod connected at one of its ends with an arm of said bell-crank and longitudinally movably connected at its opposite end with another arm of said lever, mechanism for imparting a reciprocating movement to said rake, and a cam coöperative with said mechanism for engagement with the third arm of said lever to move the latter about its fulcrum at determinate points in said movement.

5. In apparatus of the character described, a three-armed lever, a bell-crank, a rake movably suspended from arms of said bell-crank and said lever, a rod connected at one of its ends with an arm of said bell-crank, a link adjustably attached to the other end of said rod and loosely connected with another arm of said lever, mechanism for imparting a reciprocating movement to said rake, and a cam coöperative with said mechanism for engagement with the third arm of said lever to move the latter about its fulcrum at determinate points in said movement.

6. In apparatus of the character described, a trough, a reciprocating rake for moving material along the bottom surface thereof, a pair of rocker arms from which said rake is movably suspended, and means for raising said rake to a plane at an angle to that in which it has its reciprocating movement, by adjustment of the fulcrum of one of said arms.

7. In apparatus of the character described, a reciprocating rake, a bell-crank from which said rake is suspended, a winding drum, and a flexible member connected to be wound on said drum, and connected with said bell-crank for moving the same about its fulcrum.

8. In apparatus of the character described, a reciprocating rake, a bell-crank, means for adjusting the position of said crank by moving it about its fulcrum, and a pair of rocker arms from which said rake is movably suspended, one of said arms being mounted on an arm of said bell-crank.

9. In apparatus of the character described, a reciprocating rake, a bell-crank, a winding drum, a flexible member connected to be wound upon said drum and attached to an arm of said bell-crank, and a pair of rocker-arms from which said rake is movably suspended, one of said arms being mounted on an arm of said bell-crank.

10. In apparatus of the character described, a reciprocating rake, a bell-crank, means for adjusting the position of said crank by moving it about its fulcrum, and a pair of coöperatively connected rocker-arms from which said rake is movably suspended, one of said arms being mounted on an arm of said bell-crank.

11. In apparatus of the character described, a rake, a bell crank, a pair of coöperatively connected rocker-arms from which said rake is movably suspended, one of said arms being mounted on an arm of said bell-crank, a winding drum rotatable about an axis coincident with that of the other arm, a flexible member connected to be wound on said drum and attached to the other arm of said bell-crank, mechanism for imparting a reciprocating movement to said rake, and means coöperative with said mechanism for raising the same at a determinate point in its movement, by adjustment of said arms.

12. In apparatus of the character described, a rake for moving material, a bell crank, a pair of coöperatively connected rocker-arms from which said rake is movably suspended, one of said arms being mounted on an arm of said bell-crank, a winding drum rotatable about an axis coincident with that of the other arm, a flexible member connected to be wound on said drum and attached to the other arm of said bell-crank, and mechanism for imparting a reciprocating movement to said rake.

13. In apparatus of the character described, a rake for moving material along a surface, a rocker-arm from which said rake is movably suspended, and means for raising said rake by varying the position of the axis about which said arm has its movement.

14. In apparatus of the character described, a rake for moving material along a surface, an arm adjustable about a fixed axis, and a rocker arm from which said rake is movably suspended, fulcrumed on said arm.

15. In apparatus of the character described, a rake for moving material along a surface, a bell-crank, a rocker arm from which said rake is movably suspended, fulcrumed on an arm of said bell-crank, and means for varying the position of said fulcrum by adjustment of said bell-crank, connected with the other arm of the same.

16. In apparatus of the character described, a rake suspended for reciprocation to move material along an inclined surface, and means for adjusting said rake to a plane at an angle to that in which it normally has its movement, by varying the position of one of its points of suspension.

17. In apparatus of the character described, a reciprocating rake for moving material along an inclined surface, a rocker shaft from which said rake is movably suspended, and means for raising said rake by varying the position of said rocker shaft.

18. In apparatus of the character described, a pair of coöperatively connected rocker arms, a reciprocating rake movably suspended from said arms, its connection with one of them allowing of its upward self-adjustment, and means for moving said arms about their axes at determinate points in the reciprocating movement of the said rake.

19. In apparatus of the character described, a reciprocating rake having a pair of slotted hangers, and means for movably suspending said rake, including a yoke of inverted U-shape, pivoted at its transverse portion and having at its ends, trunnions within the slots of said hangers.

In testimony whereof I have affixed my signature in presence of two witnesses.

DAVID J. NEVILL.

Witnesses:
L. RHOADES,
BURT STEARNS.